(12) United States Patent
Baumgart et al.

(10) Patent No.: US 7,963,022 B2
(45) Date of Patent: Jun. 21, 2011

(54) METHOD FOR JOINING COMPONENTS WITH SHAPE MEMORY ALLOYS

(75) Inventors: Peter Michael Baumgart, San Jose, CA (US); Russell Dean Moates, San Jose, CA (US); Jorge Rubio, San Jose, CA (US); Gurinder Pal Singh, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 948 days.

(21) Appl. No.: 11/778,688

(22) Filed: Jul. 17, 2007

(65) Prior Publication Data
US 2009/0021009 A1    Jan. 22, 2009

(51) Int. Cl.
*G11B 21/24* (2006.01)
*G11B 5/53* (2006.01)

(52) U.S. Cl. .................... 29/603.03; 29/603.04; 29/450; 29/452; 403/372; 360/244.5; 360/244.6

(58) Field of Classification Search ............... 29/603.03, 29/603.04, 450, 451, 452; 360/244.5, 244.6; 403/360, 372
See application file for complete search history.

(56) References Cited

U.S. PATENT DOCUMENTS
6,704,995 B2 * 3/2004 Toensing et al. ........... 29/603.03

FOREIGN PATENT DOCUMENTS
JP    08221920 A  *  8/1996

* cited by examiner

Primary Examiner — A. Dexter Tugbang

(57) ABSTRACT

A method of swaging a head gimbal assembly (HGA) to an actuator arm comprises positioning a tubular element on the HGA adjacent a hole in the actuator arm; restraining the subassembly; providing a rod formed from a shape memory alloy (SMA), the SMA having a martensitic phase at a low temperature and an austenitic phase above a phase transition temperature that is higher than the low temperature, the rod having an initial diameter that is smaller than diameters of the tubular element and the hole; extending the rod through the tubular element and hole; heating the rod above the phase transition temperature such that the rod expands to a second diameter that is greater than the initial diameter to plastically deform the HGA and swage together the HGA and actuator arm to form an assembly; cooling the rod and removing the rod from the assembly such that the rod returns to the initial diameter.

6 Claims, 5 Drawing Sheets

METHOD FOR JOINING COMPONENTS WITH SHAPE MEMORY ALLOYS

BACKGROUND OF THE INVENTION

1. Technical Field

The present invention relates in general to joining processes and, in particular, to an improved system, method, and apparatus for swaging together two or more components with shape memory alloys.

2. Description of the Related Art

Swaging is a metal-forming technique in which metals are plastically deformed to their final shape using high pressures, either by pressing or hammering, or by forcing a die through the materials. Swaging differs from forging in that the swaged metal is cold worked, and the output of the swaging operation is usually the finished shape.

In one application, swaging may be used to join together two separate components of metal. During the process, at least one of the components is plastically deformed and pressed against the other to form a joint. Different agents and methods are used for plastic deformation of the metal. For example, in a magnetic hard disk drive, swaging is used to join head gimbal assemblies (HGAs) 11 (FIGS. 1-3) to the actuator arms 13. The suspension portion of the HGA has a base plate 11, which is embossed to produce a tubular element 15. This tubular element 15 is inserted into a hole in the arm 13 and a stainless steel ball 17 of precise diameter is pressed through the hole in the base plate 11. This process is depicted in FIGS. 1 and 2, which show isometric and cross-sectional views through the middle of the actuator arm.

FIG. 3A illustrates the assembly before plastic deformation of tubular part 15 of base plate 11 by ball 17, and FIG. 3B is after plastic deformation of tubular part 15 by ball 17. This deformation is caused by the force exerted by the stainless steel ball 17 and leads to a good contact between the suspension 11 and the arm 13.

One drawback of this method is that motion of the ball causes a shear force on the base plate and can deform it. This deformation can change the mechanical alignment of the disk drive slider with respect to the disk, causing a change in the flying height of the slider relative to the disk. Another complication is encountered during this process when two HGAs are joined to the two opposite sides of the same arm. Since the ball moves in only one axial direction, the deformation it causes can lead to an asymmetry between the suspension joined to the top of the arm and the one joined to the bottom of the arm. Thus, an improved solution that avoids these problems is needed to process these components while minimizing shear forces and eliminating the asymmetry caused by the unidirectional motion of ball.

SUMMARY OF THE INVENTION

A system, method, and apparatus for joining (e.g., swaging) together two or more components with shape memory alloys (SMA) is disclosed. For example, a rod formed from a suitable SMA is stretched under load at a low temperature (e.g., room temperature) so that its diameter is reduced. The new diameter of the rod is small enough to pass through the hole in the mount plates of HGAs. The HGAs are restrained with the boss on their mount plates or base plates, and are inserted into the hole in the arms of an actuator comb. The rod is extended through the boss in the HGAs and the actuator comb swage holes. The rod is then heated by suitable means (e.g., with electric current) to a temperature that is above its transition temperature. The diameter of the rod expands at the elevated temperature and the stress exerted by it leads to the tubular boss on the HGAs being plastically deformed to form a joint with the aluminum alloy arm of the actuator comb. The rod is then cooled by suitable means and its diameter contracts so that it can be removed from the newly swaged assembly. The process may be repeated for other combs and sets of HGAs.

In alternate embodiments, initial deformation of the boss may be performed by a stainless steel ball and the final joining is done by an SMA element. In addition, the outer surface of the SMA element may be suitably contoured for selected applications.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Embodiments of a system, method, and apparatus for joining components with shape memory alloys (SMA) are disclosed. The SMAs produce radial forces needed to deform the embossed features on the HGA base to join it to the arm. In one form, the SMA show two phases as a function of temperature. The lower temperature phase is called the martensitic phase. In this phase the material dimensions of the SMA may be changed by several percent by applying relatively low loads.

For example, a wire may be reduced in diameter by several percent by applying tensile force. Upon heating above a critical temperature, the SMA produces stresses accompanied by changes to its original shape. These stresses are high enough to plastically deform stainless steel. The high temperature phase is known as the austenitic phase. A variety of alloys show these properties, including titanium nickel (TiNi) alloys that are commercially available under the name Nitinol, for example.

Figure 1:
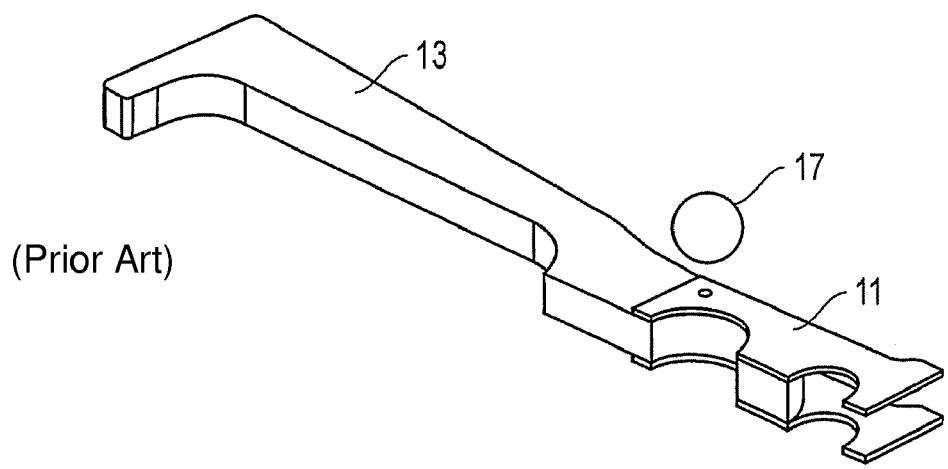
FIG. 1 is an isometric view of an assembly prior to a conventional swaging process.
Figure 2:
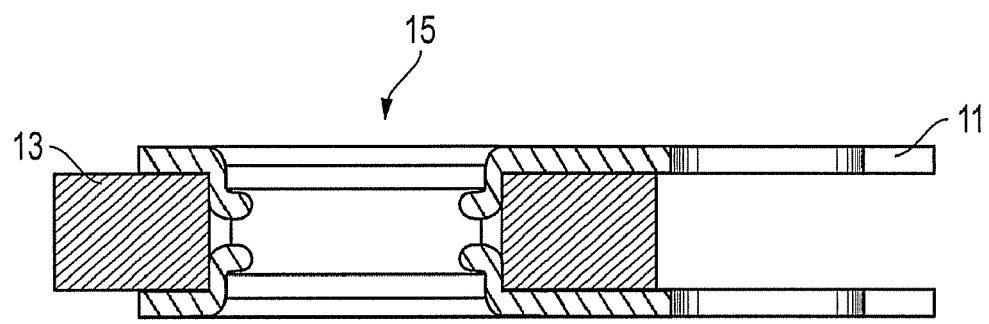
FIG. 2 is a sectional side view of the assembly of FIG. 1 after a conventional swaging process.
Figure 3B:
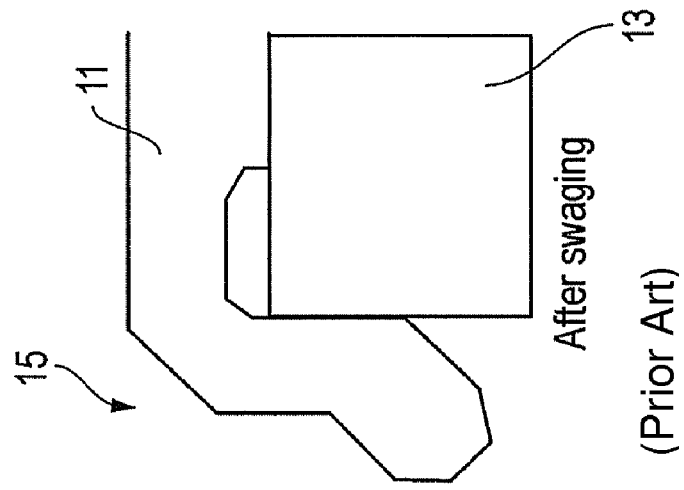
FIGS. 3A and 3B are enlarged sectional side views of the assembly of FIGS. 1 and 2 illustrating the assembly prior to swaging and after swaging, respectively.
Figure 3A:
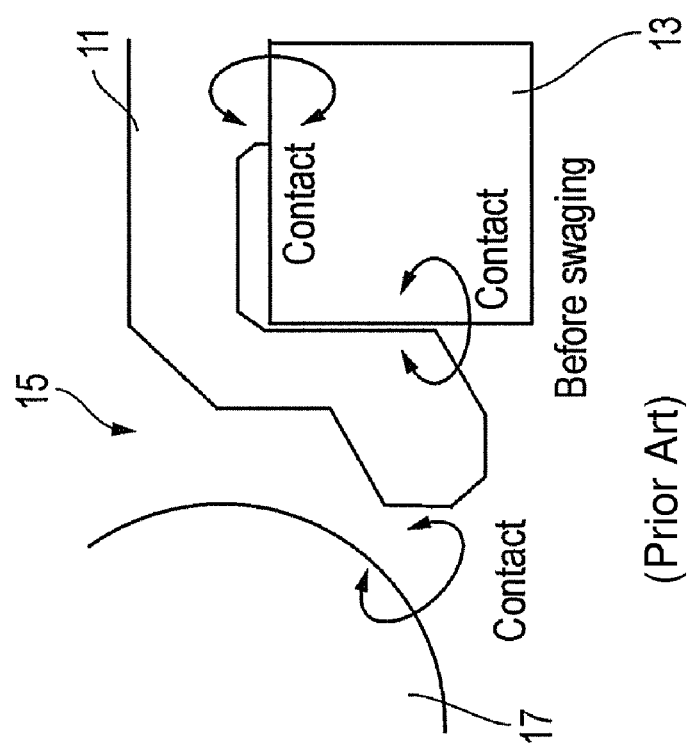
Figure 4B:
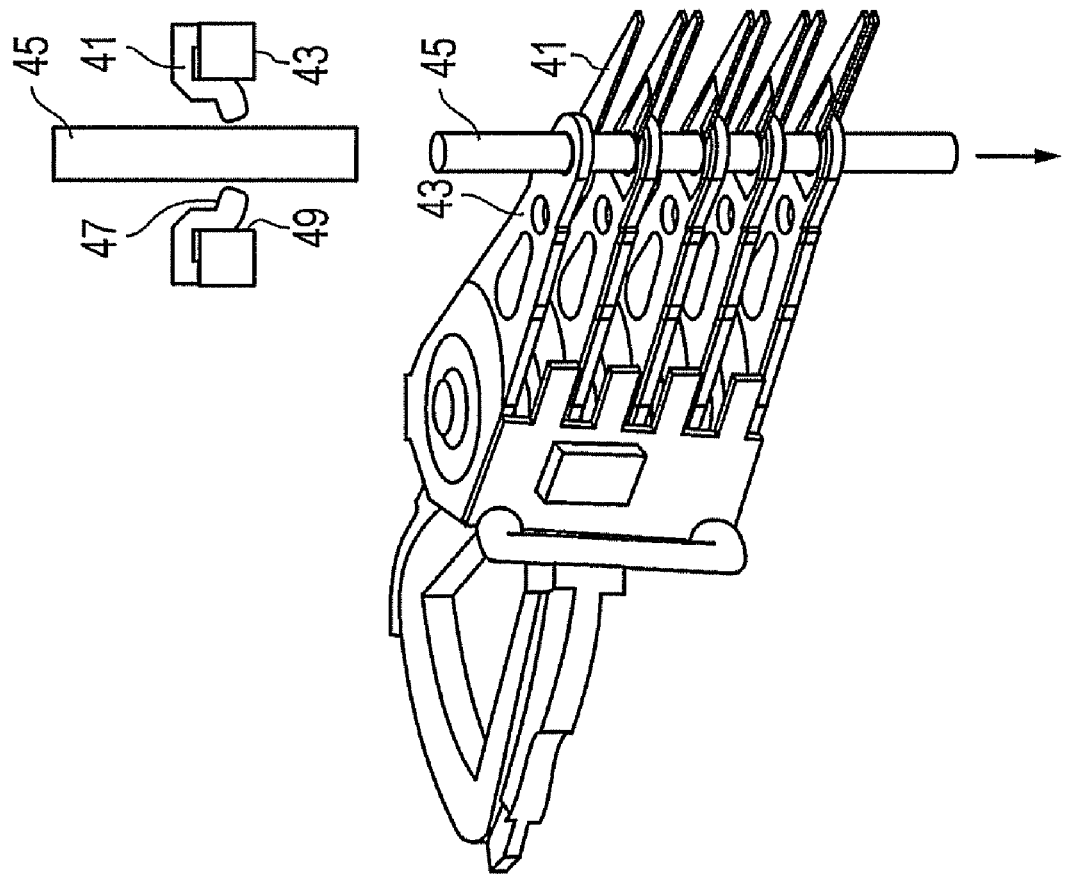
FIGS. 4A-E are isometric and enlarged sectional views of a sequence of operations in accordance with the invention.
Figure 4A:
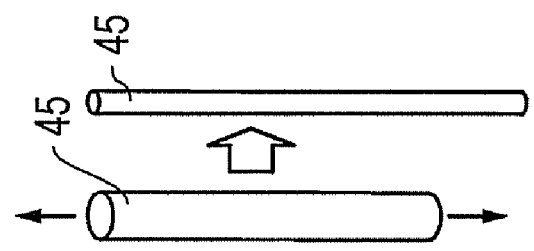

Referring to FIGS. 4A-E, one embodiment of a method of swaging a head gimbal assembly (HGA) 41 to an actuator arm 43 comprises using an SMA in the form of a rod 45. Initially (FIG. 4A), the rod 45 may be deformed by a few percent with tension at the lower temperature phase. This initial rod deformation step may be repeated before each swaging operation, depending on the application. The tubular element 47 on the HGA 41 is positioned adjacent a hole 49 in the actuator arm 43, such that the tubular element 47 and the hole 49 are coaxially aligned to form a subassembly (FIG. 4B). In one embodiment, a small initial deformation of the HGA 41 is performed by swaging with a stainless steel ball before the rod 45 is used.

Figure 4D:
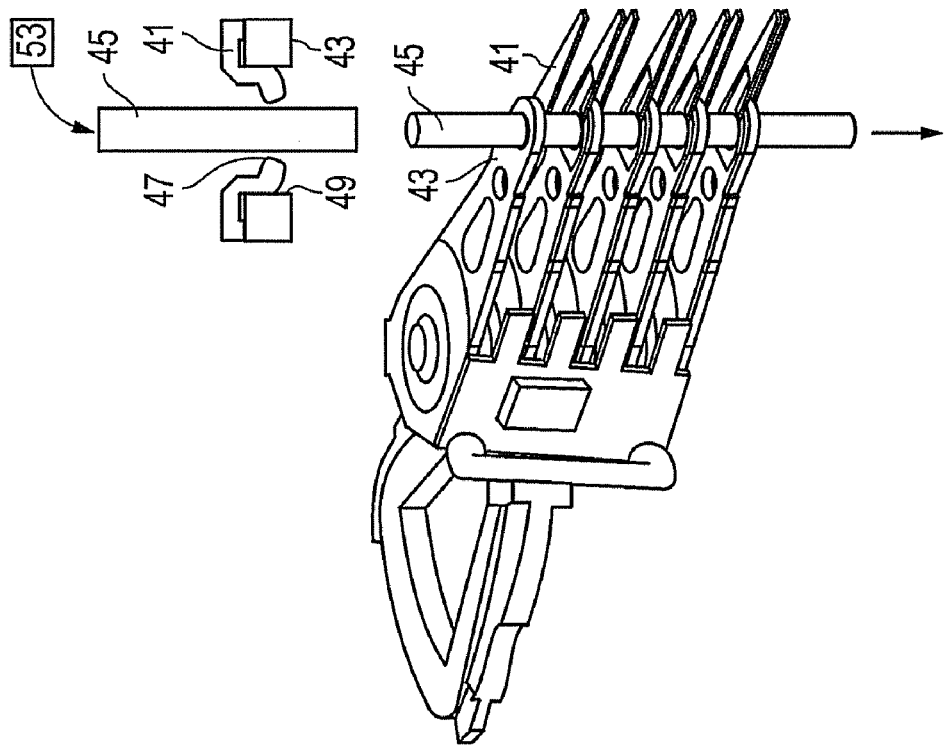
Figure 4C:
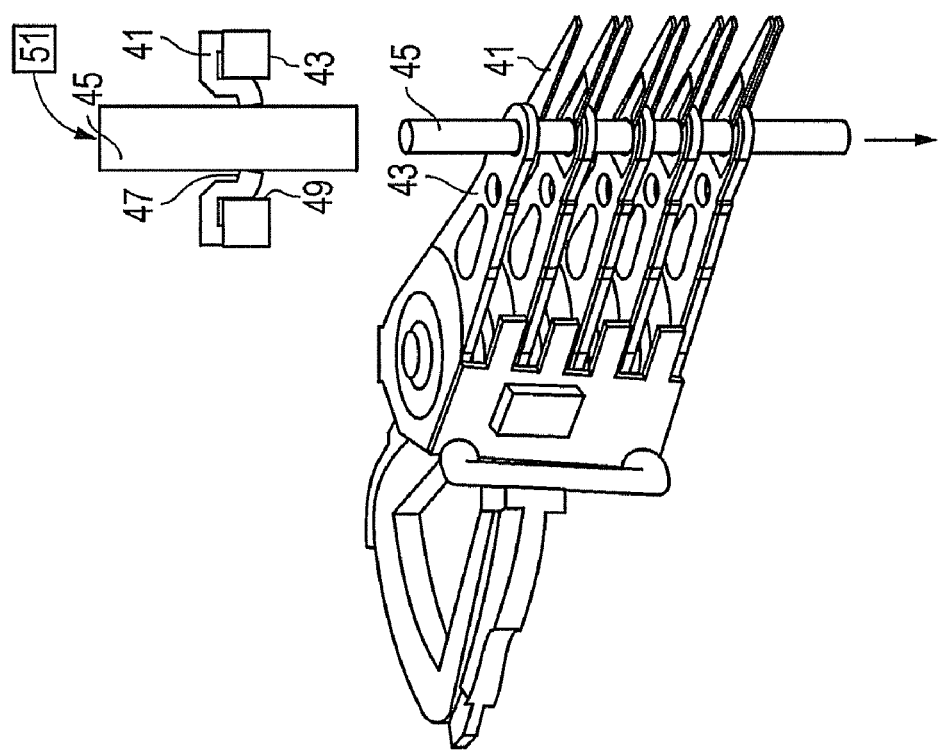
Figure 4E:
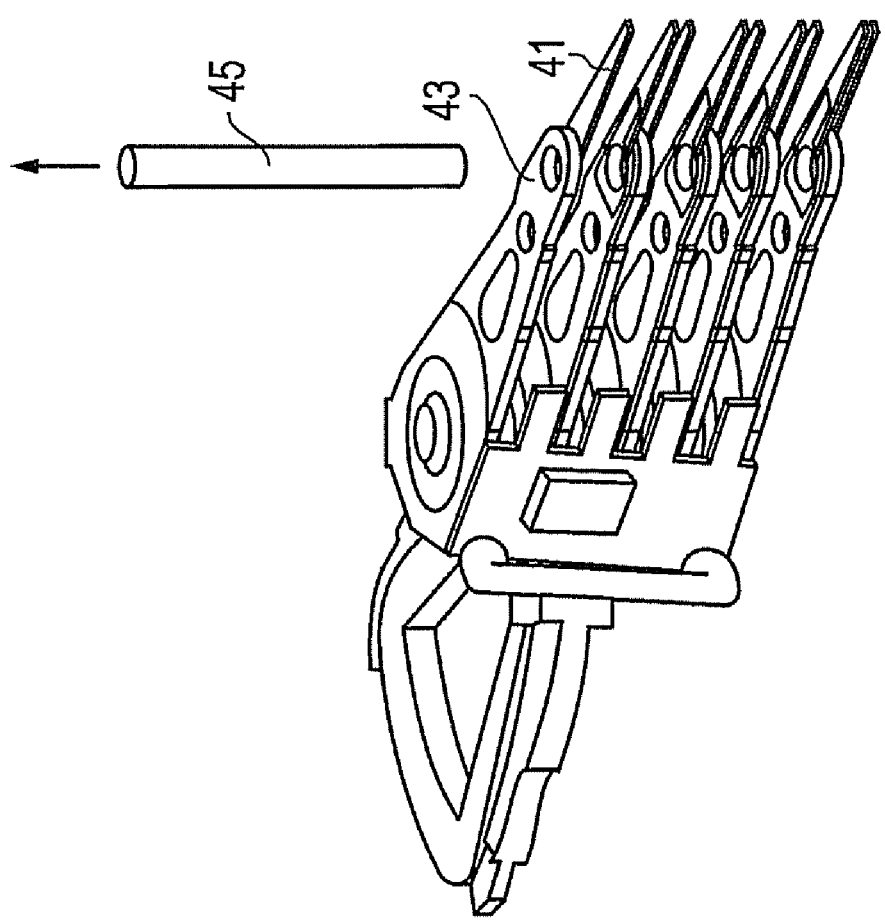

The subassembly is restrained and, as shown in FIG. 4B, the rod 45 is extended through the coaxially aligned tubular element 47 and hole 49. Referring to FIG. 4C, the rod 45 is then heated 51 to a temperature above the phase transition temperature such that the rod 45 plastically deforms the HGA 41 to swage together the HGA 41 and actuator arm 43 to form an assembly. For example, the heating step may be performed by applying electrical current to the rod, using a thermoelectric element to heat the rod, etc. As shown in FIG. 4D, the rod is then cooled 53 and subsequently removed from the assembly (FIG. 4E). For example, the rod may be cooled by passing a fluid through a passage (e.g., coaxial hole) in the rod, applying a fluid to an exterior of the rod, cooling the rod with a thermoelectric element, etc. In addition, combinations of these heating and cooling options may be utilized. The various steps described above may be repeated with the rod for additional HGA and actuator arm subassemblies. As shown, a single rod or cylinder may be used to swage multiple HGAs simultaneously in one heating and cooling cycle.

In one embodiment, the rod 45 has an initial diameter (FIG. 4B) that is smaller than diameters of the tubular element 47 and the hole 49, and is expanded to a second diameter (FIG. 4C) that is greater than the initial diameter, before returning to the initial diameter (FIG. 4D). In alternate embodiments, the rod or outer surfaces of the rod may be contoured so that a complementary contour may be formed on the HGA.

In another simplified embodiment, the method of joining components may comprise restraining first and second components adjacent each other; providing a shape memory alloy (SMA), the SMA having a martensitic phase at a low temperature and an austenitic phase at a phase transition temperature that is higher than the low temperature; positioning the SMA in proximity to at least one of the first and second components; heating the SMA to a temperature above the phase transition temperature such that the SMA plastically deforms said at least one of the first and second components to join the first and second components together; and cooling the SMA and removing the SMA from the joined first and second components.

While the invention has been shown or described in only some of its forms, it should be apparent to those skilled in the art that it is not so limited, but is susceptible to various changes without departing from the scope of the invention.

What is claimed is:

1. A method of swaging a head gimbal assembly (HGA) to an actuator arm, comprising:
   (a) positioning a tubular element on the HGA adjacent a hole in the actuator arm, such that the tubular element and the hole are coaxially aligned to form a subassembly;
   (b) restraining the subassembly;
   (c) providing a rod formed from a shape memory alloy (SMA), the SMA having a martensitic phase at a low temperature and an austenitic phase above a phase transition temperature that is higher than the low temperature, the rod having an initial diameter that is smaller than diameters of the tubular element and the hole;
   (d) extending the rod through the coaxially aligned tubular element and hole;
   (e) heating the rod to a temperature above the phase transition temperature such that the rod expands to a second diameter that is greater than the initial diameter to plastically deform the HGA and swage together the HGA and the actuator arm to form an assembly;
   (f) cooling the rod and removing the rod from the assembly such that the rod returns to the initial diameter; and
   (g) repeating steps (a) through (f) with the rod for another HGA and another actuator arm.

2. A method according to claim 1, wherein step (b) comprises initially deforming the rod by a few percent with tension at the low temperature prior to step (d), and the step of initially deforming the rod also is repeated in step (g).

3. A method according to claim 1, wherein step (e) comprises one of: applying electrical current to the rod; and using a thermoelectric element on the rod, and step (f) comprises cooling the rod with one of: passing a fluid through a passage in the rod, applying a fluid to an exterior of the rod, and cooling the rod with the thermoelectric element.

4. A method according to claim 1, wherein an initial deformation of the HGA is performed by swaging with a stainless steel ball before step (e), and a final joining step is performed in step (e) by the rod.

5. A method according to claim 1, wherein step (c) comprises contouring an outer surface of the rod, and step (e) comprises forming a complementary contour on the HGA.

6. A method according to claim 1, wherein the rod comprises a single rod that is used to swage multiple HGAs simultaneously in one heating and cooling cycle.

* * * * *